United States Patent
Bhatia et al.

(10) Patent No.: US 10,620,674 B2
(45) Date of Patent: Apr. 14, 2020

(54) PREDICTIVE MONITORING OF COMPUTER COOLING SYSTEMS

(71) Applicant: Cisco Technology, Inc., San Jose, CA (US)

(72) Inventors: Rakesh Bhatia, San Jose, CA (US); Krishna Tejaswi Mocherla, Bangalore (IN); Samruddhi Deshpande, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 359 days.

(21) Appl. No.: 15/628,694

(22) Filed: Jun. 21, 2017

(65) Prior Publication Data

US 2018/0373300 A1    Dec. 27, 2018

(51) Int. Cl.
*G06F 1/20* (2006.01)
*G05D 23/19* (2006.01)

(52) U.S. Cl.
CPC ......... *G06F 1/206* (2013.01); *G05D 23/1927* (2013.01); *G05D 23/1902* (2013.01); *G05D 23/1917* (2013.01)

(58) Field of Classification Search
CPC ........ F04D 27/004; F04D 27/001; H02P 6/06; G06F 1/206; H05K 7/20836; G05B 13/048
See application file for complete search history.

(56) References Cited

U.S. PATENT DOCUMENTS

| 6,247,898 B1 | 6/2001 | Henderson et al. |
| 6,407,672 B1 | 6/2002 | Grenz et al. |
| 7,142,125 B2 | 11/2006 | Larson et al. |
| 7,239,968 B2 | 7/2007 | Fasullo et al. |
| 8,055,124 B2 | 11/2011 | Pan |
| 9,192,076 B2* | 11/2015 | Artman ............ G06F 1/20 |
| 2003/0234630 A1* | 12/2003 | Blake ............ F04D 27/004 318/471 |
| 2009/0073731 A1 | 3/2009 | Phadke et al. |
| 2010/0315223 A1* | 12/2010 | Gross ............ G05B 13/048 340/500 |
| 2011/0299247 A1* | 12/2011 | Zhang ............ H02P 6/06 361/695 |
| 2012/0224322 A1* | 9/2012 | Artman ............ G06F 1/20 361/679.48 |
| 2013/0138364 A1* | 5/2013 | Cowles ............ G06F 1/206 702/45 |
| 2014/0111218 A1 | 4/2014 | Krishnamoorthy et al. |
| 2017/0350403 A1* | 12/2017 | Kelly ............ F04D 27/001 |
| 2018/0035572 A1* | 2/2018 | Song ............ H05K 7/20836 |

* cited by examiner

*Primary Examiner* — Kandasamy Thangavelu
(74) *Attorney, Agent, or Firm* — Edell, Shapiro & Finnan, LLC

(57) ABSTRACT

Predictive monitoring of computer cooling systems includes generating, at a computer system, a model representative of at least a relationship between a rotational speed of one or more fans configured to cool computing components and a duty cycle of the pulse-width modulation of electrical current supplied to the one or more fans. The computer system determines a first effective range for the rotational speed of the one or more fans as a function of the duty cycle based on the model and monitors data representative of the rotational speed of the one or more fans and data representative of the duty cycle. The computer system generates a predictive failure alert when the data representative of the rotational speed indicates that the rotational speed is outside of the first effective range for a particular value of the duty cycle.

20 Claims, 8 Drawing Sheets

PREDICTIVE MONITORING OF COMPUTER COOLING SYSTEMS

TECHNICAL FIELD

The present disclosure relates to computing cooling systems and, in particular, to monitoring cooling systems included in computing systems, such as fans included in server systems.

BACKGROUND

Computing/computer systems, such as server systems, typically include components designed to cool the computing system and offset heat generated by the computing system. This cooling is intended to keep the components included in the computing system at temperatures that are suitable for operation. One or more fans is often utilized to satisfy the cooling requirements of a computing device (i.e., a server). However, over time, fans or other mechanical cooling systems may degrade and ultimately fail. For example, bearings may degrade and fail or grease may dissipate, which may prevent or inhibit rotation of a fan. Once a fan, or other such cooling component, fails, the computing device may need to be shut down to prevent overheating until the fan is fixed or replaced. Alternatively, other fans in the computing system can be run at higher speeds to make up for the loss of the failed fan, but this may accelerate deterioration of the other fans, causing the other fans to fail sooner than they might under normal operating conditions. Consequently, there is a need for predicative monitoring of computing cooling systems that allows malfunctioning or deteriorating fans to be identified prior to complete failure (i.e., before the fan is unable to provide cooling).

DESCRIPTION OF EXAMPLE EMBODIMENTS

Overview

Figure 1:
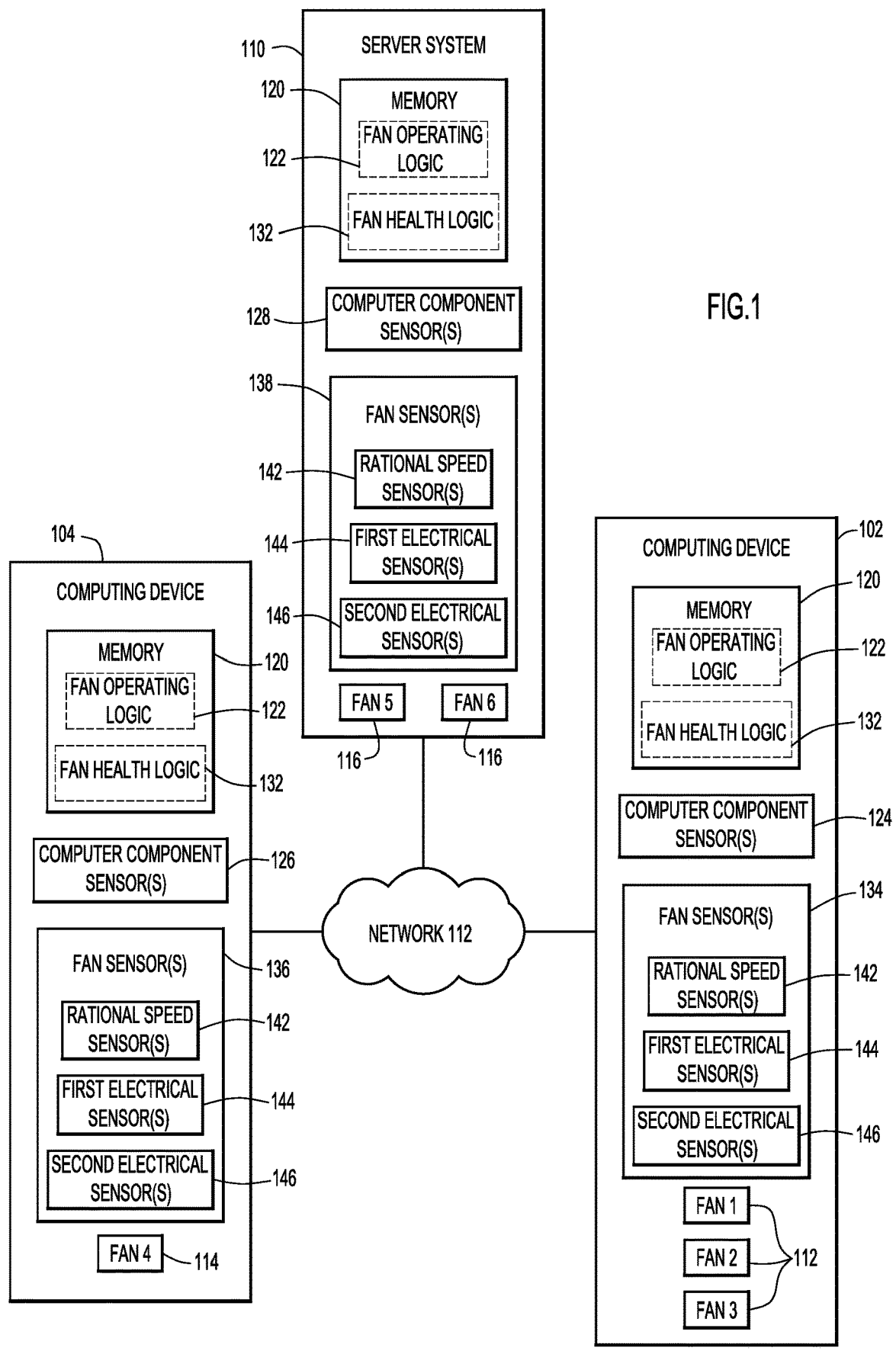
FIG. 1 is a diagram illustrating a networking environment in which the techniques presented herein may be employed, according to an example embodiment.

Techniques are presented herein for predictively monitoring computer cooling systems. These techniques may be embodied as a method, an apparatus, a system, and executable instructions in a computer-readable storage media to perform the method.

According to at least one example embodiment, predictively monitoring computer cooling systems includes generating, at a computer system, a model representative of at least a relationship between a rotational speed of one or more fans configured to cool computing components and a duty cycle of the pulse-width modulation of electrical current supplied to the one or more fans. The computer system determines a first effective range for the rotational speed of the one or more fans as a function of the duty cycle based on the model and monitors data representative of the rotational speed of the one or more fans and data representative of the duty cycle. The computer system generates a predictive failure alert when the data representative of the rotational speed indicates that the rotational speed is outside of the first effective range for a particular value of the duty cycle.

EXAMPLE EMBODIMENTS

A computer system, such as a server system, relies on a cooling system to satisfy the cooling requirements of the computer system while the computer system is operating. The computer system may be a server system, network switch such as a large network switch used in a data center, etc. Frequently, the cooling system is or includes one or more fans. However, the components of a fan, such as bearings and blades, wear or degrade over time. Additionally, grease used to lubricate the bearings may dissipate over time, preventing or inhibiting rotation of the blades and/or damaging the bearings. Since input from one or more temperature sensors included in a computer system in which the fan is included (i.e., temperatures sensors included in or programmed into a dual in-line memory module (DIMM), a Peripheral Component Interconnect (PCI) card, and/or a central processing unit (CPU)) is often used to control the amount of power supplied to the fan's motor, a fan with mechanical wear/degradation may not provide the requisite cooling for a particular sensed temperature.

Initially, mechanical wear may only slightly decrease the amount of cooling provided by a fan; however, over a short period of time (i.e., a few hours to a few weeks), the condition of the fan may worsen and, eventually, the fan may become inoperable (i.e., unable to provide cooling). Once a fan is inoperable, a computer system may need to be powered down to prevent overheating. Alternatively, if the computer system includes multiple fans, other fans in the computer system may be forced to operate above normal operating parameters to compensate for an inoperable fan. The former scenario (i.e., powering down) is obviously undesirable and the latter scenario (i.e., compensating with other fans) may also be undesirable because it may accelerate the mechanical degradation of the fans that are attempting to compensate for the failed fan. The techniques presented herein predict the failure of a fan so that a fan can be replaced prior to becoming inoperable (i.e., prior to complete failure), limiting the downtime for an associated computer system and preventing non-failing fans from operate above normal operating parameters.

More specifically, the techniques presented herein predict fan failure by monitoring rotational speed of a fan (typically measured in rotations per minute (RPM)) and/or an amount of electrical current supplied to a fan (measured in Amps) as a function of a duty cycle of the pulse-width modulation of the electrical current supplied to the fan. Monitoring the rotational speed and/or the current as a function of the duty cycle of the electrical current (as opposed to simply monitoring rotational speed or voltage over time), offers a unique insight into the operating parameters of the fan (i.e., rotational speed and/or electrical current) and allows these operating parameters to be monitored with context. If a fan is operating outside an effective range for a certain value of the duty cycle, this may indicate the fan has a mechanical issue (i.e., degradation) and, thus, should be replaced to avoid a possibly imminent fan failure.

By comparison, many existing fan health mechanisms typically only provide alerts when a fan has already failed. This creates a lag time between a fan failure and replacement operations, resulting in downtime for the computer system and/or a period of time when operable fans must operate above normal operating parameters (i.e., to compensate for a failed fan). Alternatively, monitoring systems may measure rotational speed over time, without context from an electrical operating parameter (i.e., the duty cycle of pulse-width modulation of the electrical current supplied to the fan). For example, a monitoring system may compare rotational speed to static or fixed limits. However, when fixed limits are too sensitive (i.e., lower limits are too high), fixed limits generate false positives and when fixed limits are too relaxed (i.e., lower limits are too low, such as 200 RPM across any duty cycle), the fixed limits do not provide any predictive value. Moreover, monitoring the duty cycle of the pulse-width modulation of the electrical current supplied to the fan (as opposed to simply measuring the voltage supplied to a fan) provides fine-tuned monitoring that is more appropriate for the fine-tuned control systems that are now commonly implemented with fans (which utilize pulse-width modulation to control fan speed, as opposed to voltage variations).

Reference is first made to FIG. 1 for a description of a network environment 100 in which the techniques presented herein may be employed, according to at least one example embodiment. The network environment 100 includes one or more client computer systems, depicted as computing device 102 and computing device 104, that are connected to a server system 110 via a network 112. However, network environment 100 is merely an example and in some embodiments, the techniques presented herein may be performed on a single computer system, including any one of computing device 102, computing device 104, and server system 110. That is, in some embodiments, the techniques presented herein need not be implemented in a network environment and may be performed/executed at a single computer system. An example computer system that may execute the techniques presented herein is described in further detail below with respect to FIG. 7. As is explained below, the example computer system described in FIG. 7 may be representative of any of the computer systems shown in FIG. 1 (i.e., computing device 102, computing device 104, and server system 110).

Figure 7:
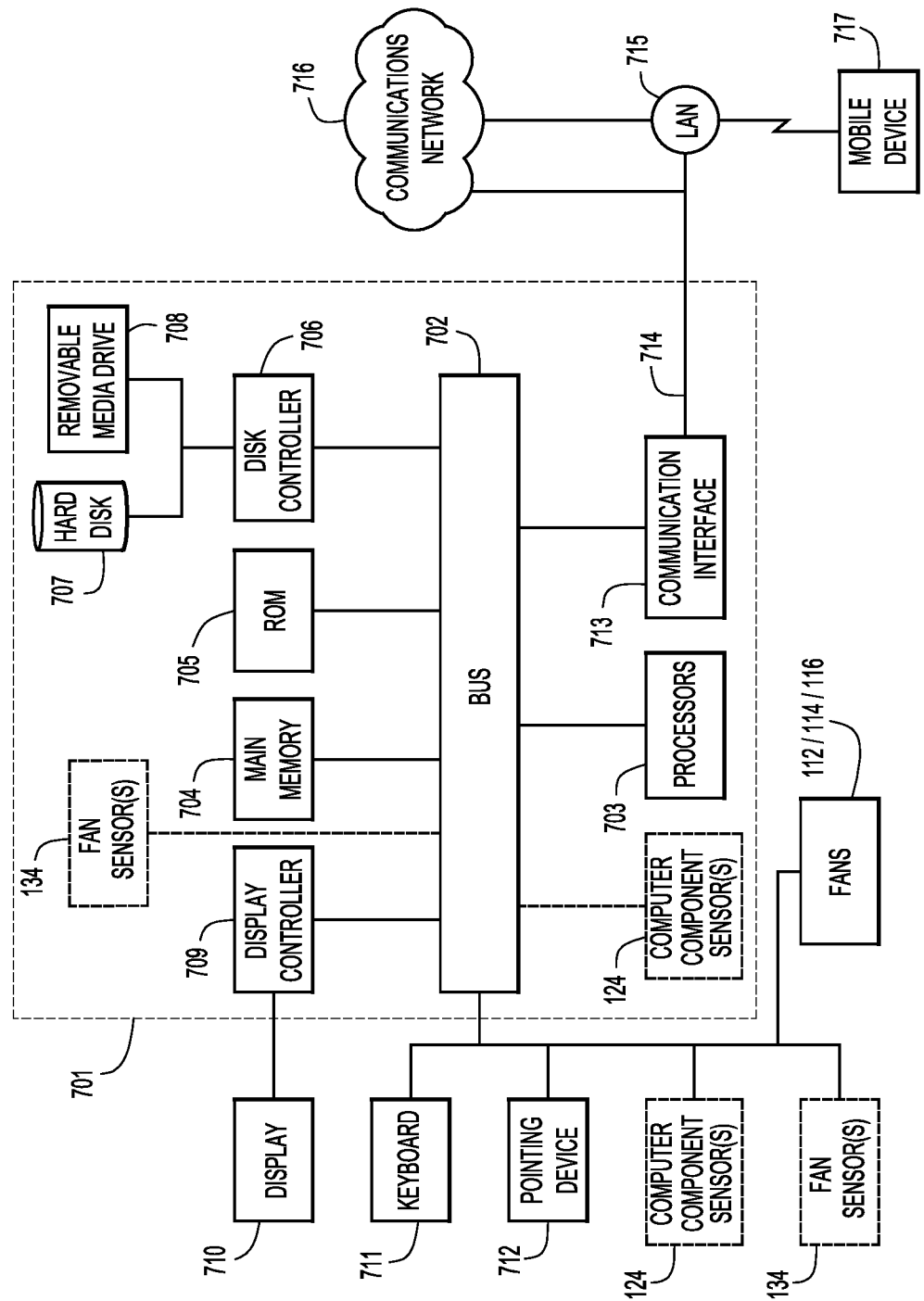
FIG. 7 is a block diagram depicting a computer system upon which the techniques presented herein may be implemented, according to an example embodiment.

Generally, each of computing device 102, computing device 104, and server system 110 include one or more fans configured to cool computing components included therein (examples of which are depicted in FIG. 7 and described below). For example, the fans may be configured to a cool a processor, controller, application-specific integrated circuit (ASIC) or any other electrical components included in a computer system. In the example embodiment depicted in FIG. 1, computing device 102 includes three fans 112 (Fan 1, Fan 2, and Fan 3), computing device 104 includes a single fan 114 (Fan 4), and the server system 110 includes two fans 116 (Fan 5 and 6); however, these are merely examples and the techniques presented herein may be compatible with any computer system including any number of fans.

In order to control the fans, each computer system (i.e., computing device 102, computing device 104, and server system 110) may include a memory 120 with fan operating logic 122 stored therein. In some examples, each computer system may include its own fan operating logic 122 that is configured to control any local fans (i.e., fan operating logic 122 on computing device 102 controls fans 112, fan operating logic 122 on computing device 104 controls fan 114, and fan operating logic 122 on server system 110 controls fans 116); however, in other embodiments, server system 110 may include fan operating logic 122 that controls fans at multiple computer systems. For example, fan operating logic 122 included at server system 110 may control the operation of fans 112, fans 114, and fans 116.

Regardless of how fan operating logic 122 is stored and implemented, the fan operating logic 122 may control a fan in response to input from various computer component sensors included in or programmed into each of the computer systems. That is, the fan operating logic 122 may control the speed of the fans 112, fan 114, and fans 116 in accordance with any fan control operations now known or developed hereafter. For example, computing device 102 may include one or more computer component sensor(s) 124, computing device 104 may include one or more computer component sensor(s) 126, and server system 110 may include one or more computer component sensor(s) 128. Each of the computer component sensor(s) 124, 126, and 128 may measure the temperature of electrical components included in its respective computer system and/or the magnitude of the electrical load at its respective computing system. Then, the fan operating logic 122 may control (locally or remotely) the fans 112, fan 114, and fans 116 based on input from the respective computer component sensor(s) 124, 126, and 128.

However, since many fan control operations run fans without regard to the mechanical condition of the fans (i.e., until failure), the techniques presented herein monitor fan operations to predict fan failure. In particular, the memory 120 of at least one of the computer systems (i.e., computing device 102, computing device 104, and server system 110) includes fan health logic 132 stored thereon. Similar to the fan operating logic 122, the fan health logic 132 may be configured to monitor only local fans (in which case, each computer system would include individualized fan health logic) or monitor fans included on multiple computer systems. For example, fan health logic 132 included at server system 110 may be configured to monitor fans 112 and fan 114, in addition to fans 116. Generally, the fan health logic 132 monitors fan health to predict fan failure by monitoring and analyzing data generated by various sensors included in or programmed into each of the computer systems.

More specifically, computing device 102 includes one or more fan sensor(s) 134, computing device 104 includes one or more sensor(s) 136, and server system includes one or more sensor(s) 138. In the depicted embodiment, sensor(s) 134, 136, and 138 each include at least one rotational speed sensor 142 configured to measure the rotational speed of a fan, a first electrical sensor 144 configured to measure current received by a fan, and a second electrical sensor 146 configured to measure or track the duty cycle of pulse-width modulation of the electrical current supplied to the fan. Depending on the particular implementation of the fan health logic 132, the fan sensors 134, 136, and 138 may be configured to generate data for processing at a local processor or generate data to be transmitted to a central computer system (i.e., server system 110). For example, if server system 110 includes fan health logic 132 configured to monitor the fans 112 included at computing device 102, the fan 114 included at computing device 104, and the fans 116 included at the server system 110, fan sensors 134 and fan sensors 136 may generate data (i.e., data representative of fan rotational speed, the electrical current received by the fan(s), and the duty cycle of the electrical current delivered to the fan(s)) to be transmitted to the server system 110.

In different embodiments, sensors 134, 136, and 138 may each include different combinations or arrangements of rotational speed sensor(s) 142, first electrical sensor(s) 144, and second electrical sensor(s) 146. As one example, in some embodiments, computing device 102 may include a single electrical sensor 114 that is configured to measure the total electrical current delivered to all of the fans 112, but the computing device 102 may include three rotational speed sensors that are each configured to measure the rotational speed of one particular fan of fans 112 (i.e., Fan 1, Fan 2, or Fan 3). Alternatively, each fan included in computing device 102 may have a dedicated rotational speed sensor 142, first electrical sensor 144, and second electrical sensor 146 (i.e., computing device 102 may include three of each of sensor 142, 144, and 146). Put another way, the techniques presented herein may operate with any combination of fan sensors included in a computer system and, thus, the techniques presented herein may be operable with a wide variety of computer systems (i.e., any computer system with fan sensors capable of providing data representative of a fan's rotational speed and electrical operating parameters).

Figure 2:
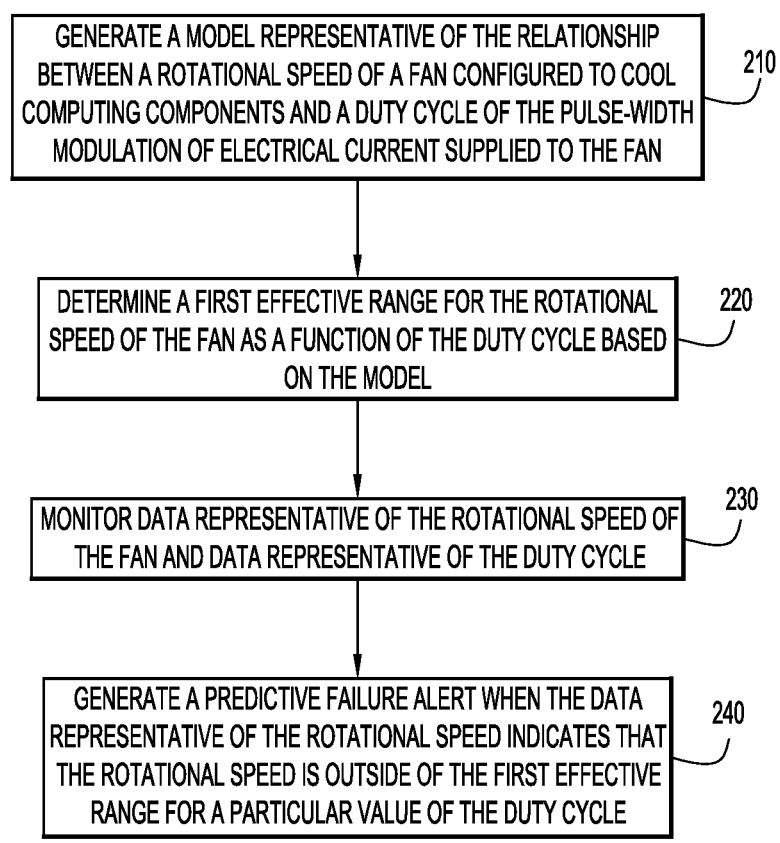
FIG. 2 is a high-level flowchart illustrating a method for predictively monitoring computer cooling systems, according to an example embodiment.

Referring next to FIG. 2 for a description of a high-level flow chart of a method 200 depicting operations performed by a computer system to predictively monitor computer cooling systems. Reference is also made to FIG. 1 for the purposes of the description of FIG. 2. As is explained above, the predictive monitoring operations (i.e., the operations depicted in FIG. 2) may be performed or executed locally or remotely. For example, server system 110 may perform the predictive monitoring operations for fans included therein and/or for fans included in computing devices 102 and 104. However, for clarity, the operations depicted in FIG. 2 are largely described as being performed at a computer system, without reference to the location of the monitored fans.

At 210, a computer system generates a model that is representative of relationships between various operating parameters of a fan (i.e., rotational speed and received electrical current) and the duty cycle of the pulse-width modulation the electrical current supplied to the fan. This model is generated prior to installation or use of the fan to ensure that the fan does not have any wear or degradation that could negatively impact the model. That is, the model is generated based on calibrated operating parameters of a fan that is to be monitored. As is described in further detail below, the relationship between the rotational speed and the duty cycle may be generally linear, but may also include steps, curves, or non-linear parts or portions. The relationship between the electrical current received at the fan and the duty cycle may also be generally linear, but may also include steps, curves, or non-linear parts or portions.

At 220, the computer system determines an effective range for the rotational speed as a function of the duty cycle. The effective range establishes upper and lower limits for the rotational speed as a function of the duty cycle. The upper and lower limits may be standard deviations determined based on the model. For example the limits for the rotational speed may span ±3σ or ±6σ around a nominal curve that represents the relationship between the rotational speed and the duty cycle. In some embodiments, the same process may be used to determine an effective range for the electrical current received by the fan as a function of the duty cycle.

Figure 3:
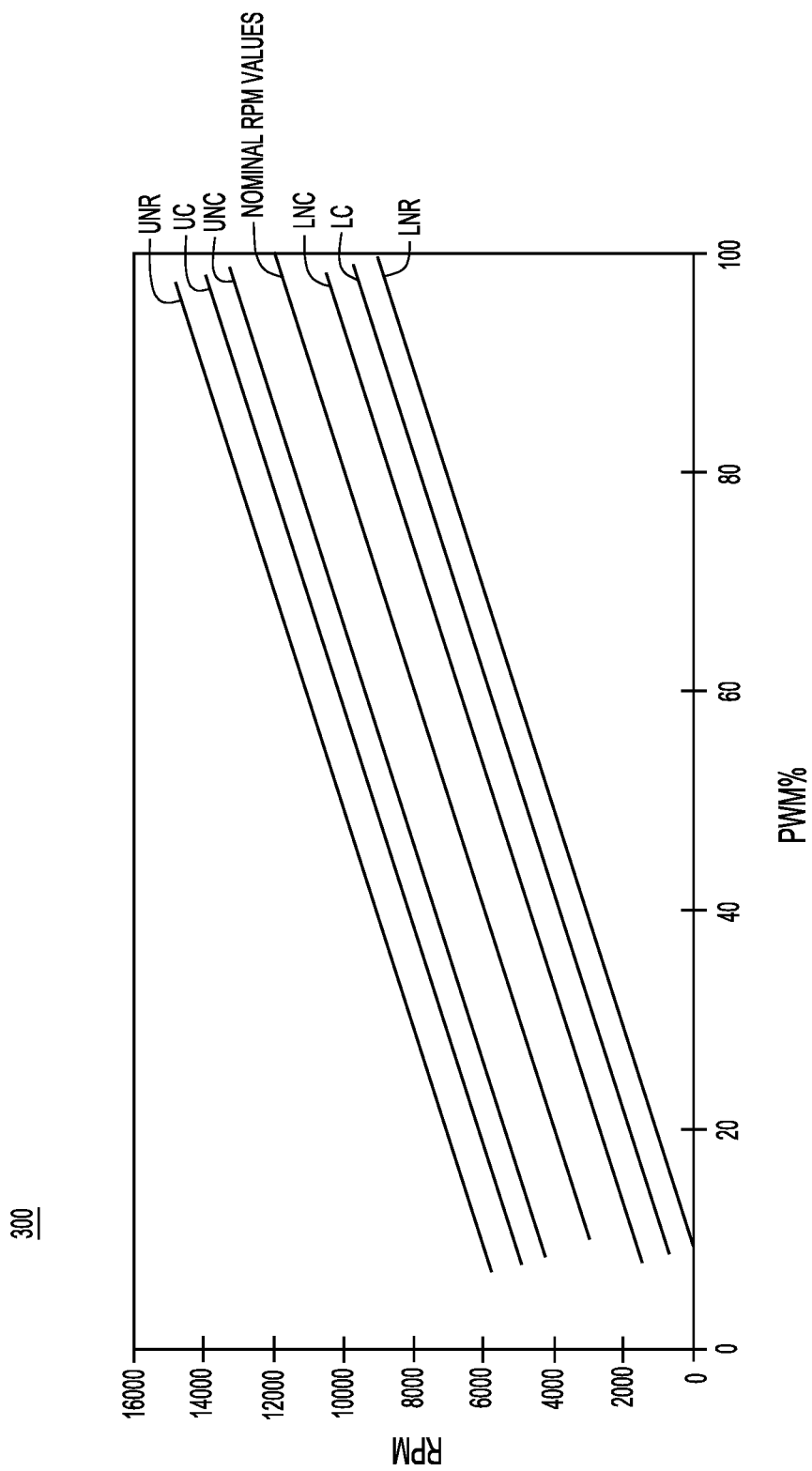
FIGS. 3-5 are diagrams depicting models that are generated to predictively monitor computer cooling systems, according to example embodiments.
Figure 4:
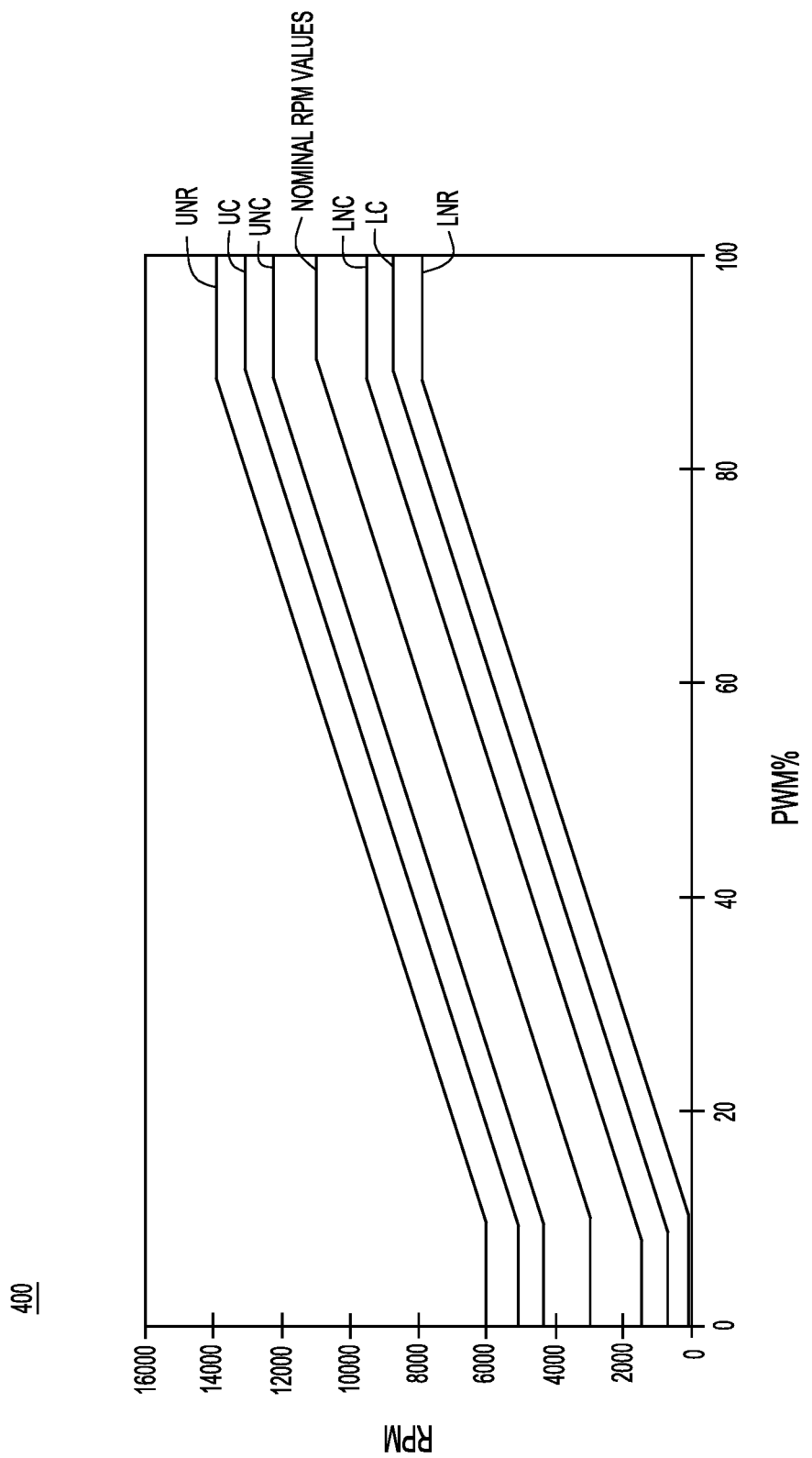
Figure 5:
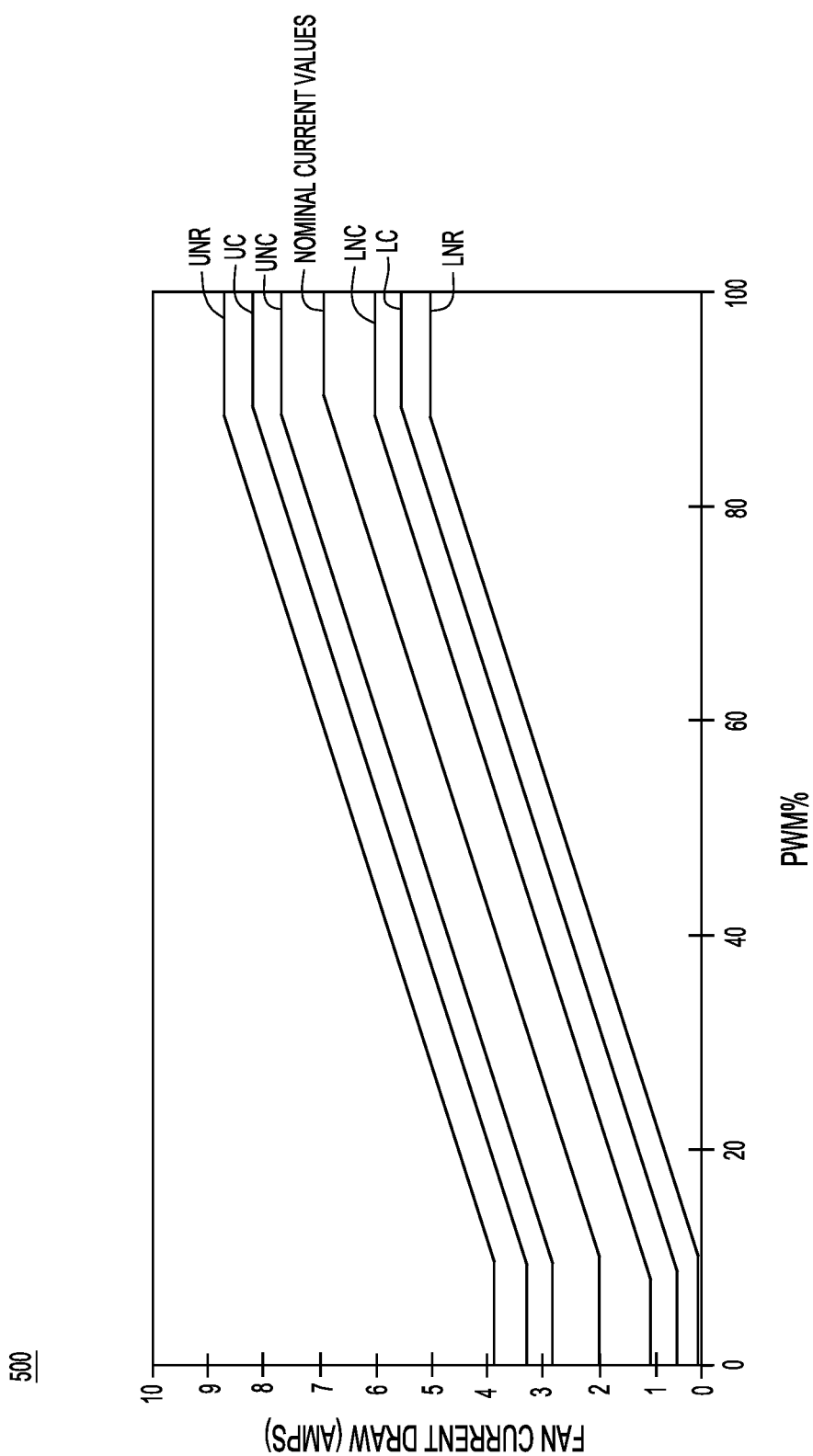

Turning briefly to FIGS. 3-5, these figures illustrate graphical plots depicting example models and effective ranges. In FIGS. 3 and 4, diagram 300 and diagram 400 illustrate example relationships between the rotational speed of a fan (represented in RPM) and the duty cycle of the pulse-width modulation of the electrical current delivered to the fan (PWM %). By comparison, in FIG. 5, diagram 500 illustrates an example relationship between the current received by a fan (represented in Amps) and the duty cycle of the pulse-width modulation of the electrical current delivered to the fan (PWM %). In each of diagrams 300, 400, and 500, the relationships are primarily linear so that nominal values for the rotational speed and current at different duty cycles form a substantially straight line (i.e., Nominal RPM Values or Nominal Current Values). However, diagrams 400 and 500 also include steps at the upper and lower most duty cycle (PWM %) values, above approximately 90% and below approximately 10%. This may represent the maximum and minimum speeds/current drawn by a fan (as determined during testing) and is merely one example of how the determined relationships may vary or accommodate different fan features. If, in other instances, a fan does not have a minimum speed, the generated model may identify this and the resultant relationship would not have a step for duty cycles below 10%.

Still referring to FIGS. 3-5, diagrams 300, 400, and 500 also depict ranges for the rotational speed and electrical current, as determined based on standard variations of the modeled data. More specifically, diagrams 300, 400, and 500 depict three ranges centered around the nominal values: a non-critical range spanning from a lower non critical (LNC) value to a upper non critical (UNC) value; a critical range spanning from a lower critical (LC) value to an upper critical (UC) value; and a non-recoverable range spanning from a lower non recoverable (LNR) value to an upper non recoverable (UNR) value. Each of these ranges represents a different number of standard variations from the nominal value curves/lines, such as ranges that are separated from each other by ±3σ or ±6σ. (σ may be quite low, such as 200 rpm for rotational speed, due the consistency of the data, so that for a fan normally operating around 10,000 rpm, 6σ provides a reasonable range). As is implied by the names of the ranges, each range represents a different predicted state of the fan (with the chance of imminent failure increasing as the ranges move further from the nominal values). Consequently, although any of the ranges may be selected as the effective range in different embodiments, the non-critical or critical range may be most effective for predicting failures.

Notably, because the model generates relationships between operating parameters (i.e., rotational speed and electrical current received) and the duty cycle, the effective ranges of the operating parameters closely track the fan through any operations of the computer system. That is, the effective range is a dynamic effective range that maps the effective range to the current duty cycle, regardless of the workload or temperature of the computer system (which may vary, and cause the current supplied to the fan to cycle through a number of duty cycles during operations of the computer system). Put another way, the effective ranges are parallel to (and, thus, increase or decrease with) the nominal curve that represents how the operating parameters (i.e., rotational speed and electrical current received) correspond with the duty cycle.

Turning back to FIG. 2, at 230, the computer system monitors data representative of the rotational speed of the fan and the duty cycle of the pulse-width modulation of the electrical current received by the fan. This monitoring may entail requesting or receiving data from various sensors installed in the computer system. For example, a rotational speed sensor included in the computer system may be configured to sense a rotational speed of the fan during operation of the fan and generate the data representative of the rotational speed of the fan. Similarly, an electrical sensor may be configured to sense the duty cycle of the pulse-width modulation of electrical current delivered to the fans and generate data representative of the duty cycle. The electrical sensor (or another electrical sensor) may also sense the electrical current received by the fan during operation of the fan and generate data representative of the magnitude of the received electrical current.

Additionally or alternatively, this monitoring may entail requesting or receiving, via a network connection to a remote computer system, data representative of the rotational speed of a fan installed on a remote computer system, data representative of the duty cycle of the pulse-width modulation of the electrical current received by the fan installed on the remote computer system, and/or data representative of the amount of current received by the fan installed on the remote computer system. Moreover, when the monitoring involves monitoring data representative of the magnitude of the electrical current received at a plurality of fans, the monitoring may entail monitoring the total electrical current drawn by the plurality of fans and/or monitoring the current drawn by each of the plurality of fans individually. These variations are discussed in further detail below.

At 240, the computer system analyzes the data. When the data indicates that a fan's rotational speed is outside of the effective range for a particular value of the duty cycle, the computer system generates a predictive failure alert. In some embodiments, each fan has or is associated with individual sensors and, thus, at 240, the computer system can compare an instantaneous rotational speed of each fan to an appropriate effective range of the dynamic effective range determined based on the model. If the instantaneous rotational speed for a particular fan is outside of the dynamic effective range, the instantaneous rotational speed may indicate that the fan is malfunctioning and, thus, the computer system predicts that the monitored fan is likely to fail. Alternatively, a predictive failure alert may be generated when either the electrical current received at the fan or the rotational speed of a fan is outside of its dynamic effective range, as is described in further detail below in connection with FIG. 6A.

However, in some embodiments, a single instance of an instantaneous rotational speed (or electrical current) outside of the dynamic effective range may need to be confirmed before the computer system predicts that the monitored fan is likely to fail. As one example, the computer systems may obtain additional data samples and generate the predictive failure alert when the additional samples satisfy a failure threshold. In some instances, the threshold may require that over 50% of the instantaneous rotational speed data samples taken over a predetermined time period are outside the dynamic effective range. As another example, a two-step verification may be used to generate a predictive failure. For example, if a detected rotational speed is determined to be outside the effective range, this determination may be confirmed by determining whether the electrical current drawn to the fan in question is outside a dynamic effective range of the electrical current. Alternatively, if an electrical current drawn to a fan is determined to be outside its dynamic effective range, this determination can be confirmed by a rotational speed that is outside its effective range. An example two-step verification process is described in further detail below in connection with FIG. 6B.

However, before turning to FIGS. 6A and 6B, it is to be understood that the predictive failure alert may be generated, and subsequently delivered or issued, in a number of manners. For example, in some embodiments, generating a predictive failure alert (at 240) comprises generating a System Event Log (SEL) entry at a server system. Additionally or alternatively, generating a predictive alert may involve generating an alert on a graphical user interface of a computing device, illuminating a light included on dashboard, and/or generating an email to be sent to a system administrator, network engineer, etc. Regardless of how the alert is issued, the alert notifies a user that a particular fan is malfunctioning and likely to fail. This allows the user to order a new fan and/or replace/repair the malfunctioning fan prior to complete failure. For example, a user may order a new fan, contact customer service for a repair, and/or add grease to the bearings of the fan (to lubricate a fan and extend its life) in response to receiving the generated alert.

Figure 6A:
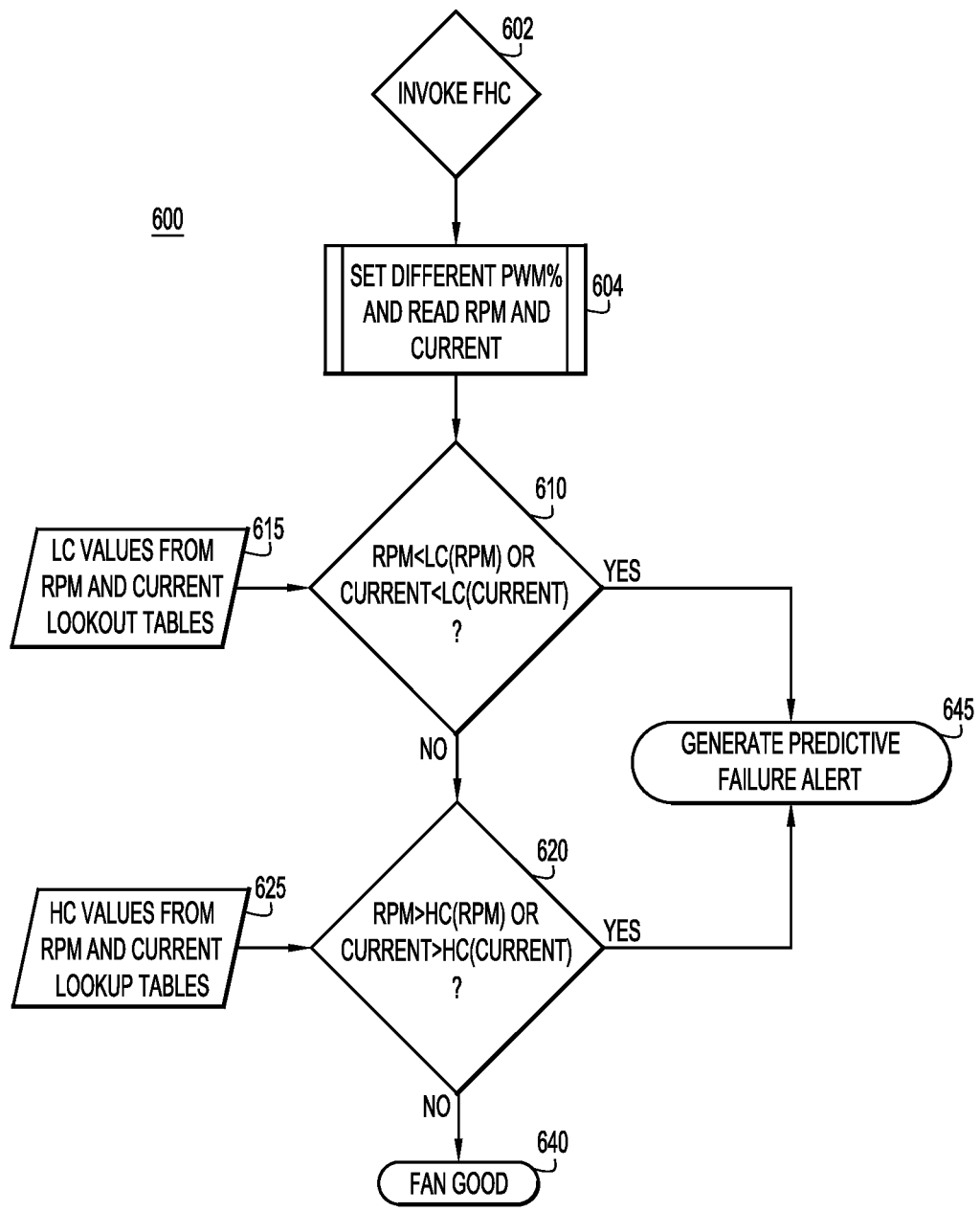
FIGS. 6A and 6B are flowcharts illustrating operations for predictively monitoring computer cooling systems, according to example embodiments.

Now turning to FIG. 6A for a description of a method 600 of generating a predictive failure alert based on either rotational speed of a fan or electrical current received by a fan as a function of the duty cycle of the pulse-width modulation of the electrical current. Initially, at 602, a computing system invokes a fan health check (FHC). As one example, a fan health check may be invoked as a time-based job (i.e., as a CronJob upon boot up of a baseboard management controller). Once a fan health check is invoked, the computing system reads/monitors the rotational speed of the fan, the electrical current received at the fan, and the duty cycle of the pulse width-modulation applied to the electrical current powering the fan as the fan is driven to different speeds (i.e., by fan control logic in response to the temperature of the computing system) at 604. Since a fan naturally cycles through various speeds during operation of its host computer system, a number of different data points can be acquired at 604. For at least a subset of these data points, the rotational speed and received electrical current can be compared to the effective range (i.e., the critical range).

More specifically, at 610, instantaneous rotational speed and instantaneous current received at the fan can be compared to lower critical values for these parameters. The lower critical values are looked up from lookup tables, as indicated at 615, that include values determined based on a dynamic range from the model as a function of the duty cycle (i.e., the LC value for the particular duty cycle, as determined, for example, based on diagram 400 and diagram 500, respectively). If the instantaneous rotational speed is higher than the LC for the rotational speed (LC(RPM)) for the particular duty cycle and the instantaneous current is higher than the LC for current received at the fan (LC (Current)) for the particular duty cycle, the method 600 proceeds to 620. At 620, the instantaneous rotational speed and instantaneous current received at the fan are compared to higher critical values for these parameters at 620 (i.e., HC(RPM) and HC(Current)). The higher critical values are also looked up from lookup tables, as indicated at 625.

If, at 620, the instantaneous rotational speed and instantaneous current are lower than the HC value for the rotational speed (HC(RPM)) and the HC value for current received at the fan (HC(Current)) for the particular duty cycle, respectively, the fan is working properly, as indicated at 640. If, instead, during one of the comparisons performed at 610 and 620, the instantaneous rotational speed is found to be outside its effective range (i.e., the critical range) or the instantaneous current drawn into the fan is found to be outside its effective range (i.e., the critical range), a predictive failure alert is generated at 645. However, in some embodiments, a certain threshold of data points may need to be outside the effective range before the alert is generated, as was mentioned above.

Figure 6B:
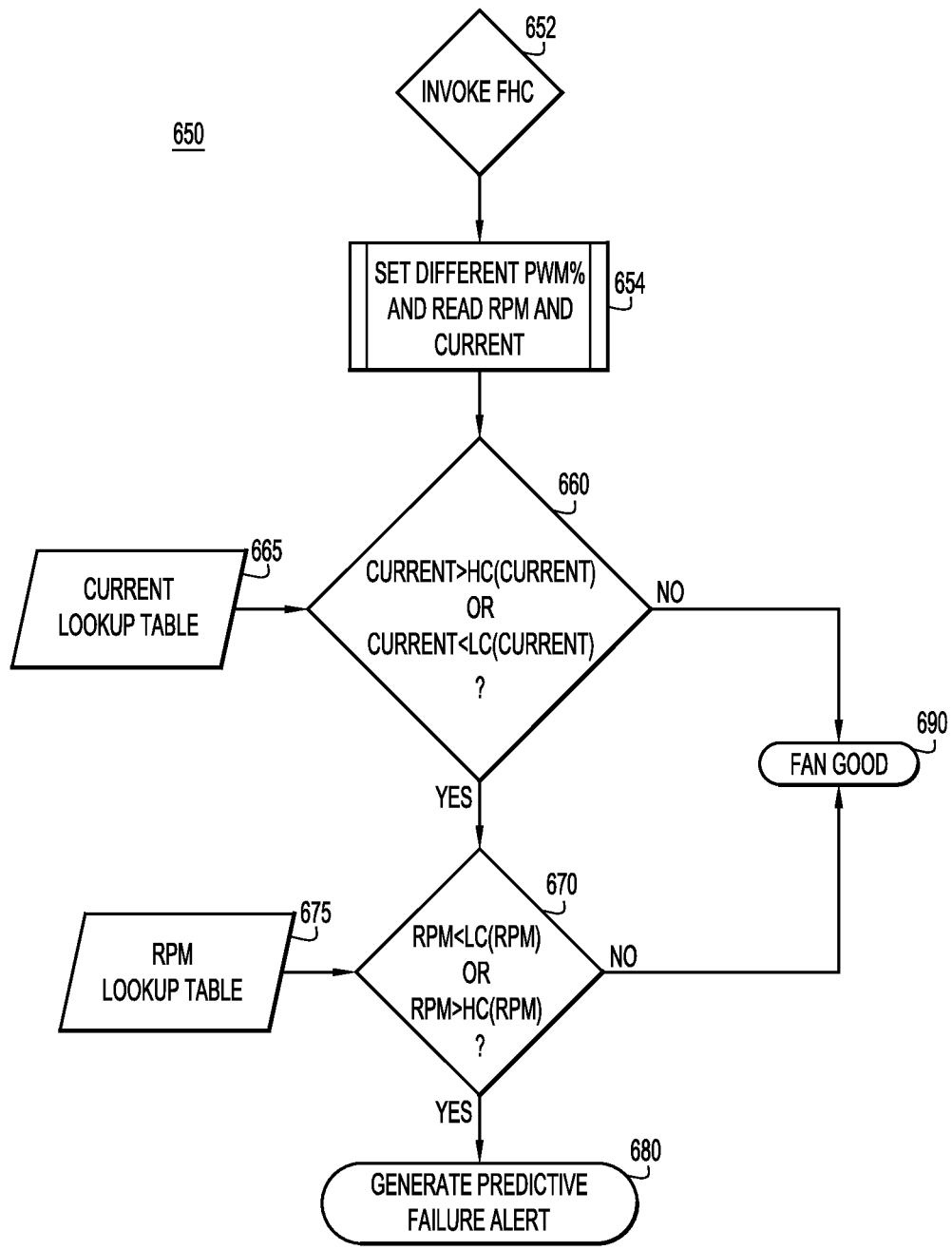

Now turning to FIG. 6B for a description of a method 650 of generating a predictive failure alert with two-step verification. Generally, method 600 (from FIG. 6A) generates an alert if either parameter is outside its effective range. By comparison, the two-step verification utilized by method 650 checks both rotational speed of a fan and electrical current received by a fan as a function of the duty cycle and only generates an alert when both parameters are outside of their effective range. More specifically, at 652, a computer system invokes a fan health check (FHC). Then, at 654 the computing system reads/monitors the rotational speed of the fan, the electrical current received at the fan, and the duty cycle of the pulse width-modulation applied to the electrical current. These operations are nearly identical to operations performed at 602 and 604 from FIG. 6A and, thus, for brevity, the description of these steps included above is to be understood to apply to the operations performed at 652 and 654.

Once data is retrieved for the rotational speed, electrical current, and duty cycle (or at least once data is retrieved for the electrical current and duty cycle), the instantaneous current is compared to its effective range (i.e., the critical range) at 660. The current values for the effective range are obtained from lookup tables, as indicated at 665, and if the instantaneous current is outside of the effective range (i.e., higher than the HC(Current) or lower than the LC(Current) for the particular duty cycle), this may indicate that a fan is likely to fail (i.e., the fan is likely to become inoperable). Consequently, at 670, an instantaneous rotational speed corresponding to the instantaneous current (i.e., an instantaneous rotational speed value from the same time as the instantaneous current value) is compared to its effective range (i.e., the critical range from FIG. 4), which is obtained from a RPM lookup table, as indicated at 675. As is explained above, the RPM and current lookup tables may catalog the critical values for a range of duty cycles, as determined based on a generated model. In other words, lookup tables may represent at least one of the diagrams from FIGS. 3-5 in a table format.

If, at 670, the instantaneous rotational speed received at the fan is outside its effective range (i.e., higher than the HC(RPM) or lower than the LC(RPM) for the particular duty cycle), this may confirm that the fan is malfunctioning and likely to fail. Thus, at 680, a predictive failure alert is generated. However, as has been mentioned, in some instances, the alert will only be generated when a certain threshold is satisfied. For method 650, the threshold may include sub-thresholds that must be satisfied at step 660 and step 670. That is, in some embodiments, the rotational speeds read by the computer system must satisfy a certain threshold before the rotational speed of a fan is determined to be outside its effective range at 660. Additionally or alternatively, the currents read by the computer system must satisfy a certain threshold before the current received at the fan is determined to be outside its effective range at 670. If, instead, current and rotational speed readings taken by or received at the computer device are within their effective ranges (or do not satisfy its threshold), the fan may be determined to be in satisfactory condition to continue operating at 690.

Still referring to FIG. 6B, method 650 may be particularly useful in implementations where a computing device includes an electrical sensor that measures a total current delivered to multiple fans. In these scenarios, the instantaneous current may measure the total current delivered to multiple fans. Then, if the total current is found to be outside of its effective range, the rotational speed of each fan may be analyzed to identify the specific fan that is malfunctioning (and causing the current to be outside of its effective range). In some embodiments, current drawn by each of the fans may also be individually monitored after total current is found to be outside of its effective range. That is, in some embodiments, a computer system including monitored fans may be configured to sense total current delivered to a plurality of fans as well as the amount of current delivered to each individual fan.

Generally, method 600 and 650 are just two examples of operations that may be performed to predict a fan failure based on a dynamic effective range for an operational parameter of a fan. These examples are not intended to be limiting. For example, in some embodiments, operations 670 and 660 may be reversed, so that a fan's received current is checked against its effective range after the rotational speed is determined to be outside of its effective range. Still further, in some embodiments, a computer system may analyze sampled current and rotational speeds against the critical range, non-critical range, and non-recoverable ranges and issue different alerts based on the range that the samples fall into. Similarly, a computer system may generate different alerts when analyzed data is above an effective range and when analyzed data is below an effective range. For example, if the rotational speed is above the effective range, the computer system may issue a predictive failure alert indicating a low probability of imminent failure, but if the rotational speed is below the effective range, the computer system may issue a predictive failure alert indicating a high probability of imminent failure.

Now referring to FIG. 7 for a description of a computer system 701 upon which the techniques presented herein may be implemented. As mentioned, the computer system 701 may be representative of computing devices 102 and 104, as well as server system 110, of FIG. 1.

The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing fan health logic 132 and fan operating logic 122 (see FIG. 1), or at least a portion thereof, temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703. For example, ROM 705 may be used for storing fan health logic 132 (see FIG. 1) and fan operating logic 122 (see FIG. 1), or at least a portion thereof. Memory 704 and/or ROM 705 may be representative of memory 120 from FIG. 1.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, tape drive, and removable magneto-optical drive, optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as liquid crystal display (LCD), or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen.

Still further, the computer system 701 is connected to fans, such as fans 112/114/116 (see FIG. 1). Moreover, the computer system 701 may include or be connected to computer component sensor(s) 124 and fan sensor(s) 134 (see FIG. 1) that are configured to monitor operating parameters of the computer system 701 and the fans 112/114/116, respectively.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (e.g., a network engineer). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

To summarize, in one form, a method is provided comprising: generating, at a computer system, a model representative of at least a relationship between a rotational speed of one or more fans configured to cool computing components and a duty cycle of the pulse-width modulation of electrical current supplied to the one or more fans; determining a first effective range for the rotational speed of the one or more fans as a function of the duty cycle based on the model; monitoring data representative of the rotational speed of the one or more fans and data representative of the duty cycle; and generating a predictive failure alert when the data representative of the rotational speed indicates that the rotational speed is outside of the first effective range for a particular value of the duty cycle.

In another form, an apparatus is provided comprising: a processor configured to: generate a model representative of at least a relationship between a rotational speed of one or more fans configured to cool computing components and an a duty cycle of the pulse-width modulation of electrical current supplied to the one or more fans; determine a first effective range for the rotational speed of the one or more fans as a function of the duty cycle based on the model; monitor data representative of the rotational speed of the one or more fans and data representative of the duty cycle; and generate a predictive failure alert when the data representative of the rotational speed indicates that the rotational speed is outside of the first effective range for a particular value of the duty cycle.

In yet another form, one or more non-transitory computer-readable storage media is provided encoded with software comprising computer executable instructions and when the software is executed operable to: generate a model representative of at least a relationship between a rotational speed of one or more fans configured to cool computing components and a duty cycle of the pulse-width modulation of electrical current supplied to the fan; determine a first effective range for the rotational speed of the one or more fans as a function of the duty cycle based on the model; monitor data representative of the rotational speed of the one or more fans and data representative of the duty cycle; and generate a predictive failure alert when the data representative of the rotational speed indicates that the rotational speed is outside of the first effective range for a particular value of the duty cycle.

A number of advantages are achieved via the methods, device(es), and computer readable media described herein. For example, the fan health check implemented by the methods, device(es), and computer readable media will significantly enhance an ability of computing systems to predict fan failure. This avoids downtime associated with an unpredicted fan failure and/or prevents excessive wear from being applied to additional fans that are attempting to compensate for a failed fan. Moreover, as compared to previous fan monitoring techniques, the techniques presented herein provide additional reliability while minimizing false positives. For example, since the techniques monitor fan operating parameters as a function of a duty cycle of the pulse-width modulation of electrical current supplied to the fan, the techniques offer a reliable monitoring system for fans that are driven with pulse-width modulation techniques (as opposed to fans driven with voltage variations). Pulse-width modulation control offers significant control, efficiency, and power savings compared to voltage scaling and is now almost universally used in cooling applications. Since the pulse-width modulation control of fan involves fast switching of operating voltages between a high and a low voltage, a simple voltage tracking scheme will not work for a pulse-width modulation controlled fan.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
    generating, at a computer system, a model representative of at least a relationship between a rotational speed of one or more fans configured to cool computing components and a duty cycle of a pulse-width modulation of electrical current supplied to the one or more fans;
    determining at least three first effective ranges for the rotational speed of the one or more fans as a function of the duty cycle based on the model, wherein determining the at least three first effective ranges includes:
        determining a non-critical range for the rotational speed of the one or more fans as the function of the duty cycle based on the model, the non-critical range spanning from a lower non-critical value to an upper non-critical value,
        determining a critical range for the rotational speed of the one or more fans as the function of the duty cycle based on the model, the critical range spanning from a lower critical value to an upper critical value, and
        determining a non-recoverable range for the rotational speed of the one or more fans as the function of the duty cycle based on the model, the non-recoverable range spanning from a lower non-recoverable value to an upper non-recoverable value;
    monitoring data representative of the rotational speed of the one or more fans and data representative of the duty cycle; and
    generating a predictive failure alert based on a relationship between the data representative of the rotational speed and one or more of the at least three first effective ranges for a particular value of the duty cycle.

2. The method of claim 1, wherein the model is generated based on calibrated parameters of the one or more fans and the model is further representative of a relationship between electrical current drawn by the one or more fans and the duty cycle of the pulse-width modulation, and the method further comprises:
    determining a second effective range for the electrical current drawn by the one or more fans as a function of the duty cycle of the pulse-width modulation based on the model; and
    monitoring data representative of the electrical current drawn by the one or more fans, wherein the generating includes generating the predictive failure alert when the data representative of the electrical current drawn by the one or more fans indicates that the electrical current is outside of the second effective range for the particular value of the duty cycle of the pulse-width modulation or the data representative of the rotational speed indicates that the rotational speed is outside of the one or more of the at least three first effective ranges for the particular value of the duty cycle of the pulse-width modulation.

3. The method of claim 2, wherein the one or more fans comprises a plurality of fans and the electrical current drawn by the one or more fans is the total electrical current drawn by the plurality of fans.

4. The method of claim 2, wherein the monitoring of the data representative of the electrical current drawn by the one or more fans comprises:
individually monitoring the electrical current drawn by each fan of the one or more fans.

5. The method of claim 1, wherein the relationship is a linear relationship with steps that cover duty cycles above approximately 90% and below approximately 10%.

6. The method of claim 1, wherein the one or more fans are installed on the computer system and the method further comprises:
sensing a rotational speed of each of the one or more fans during operation of a respective fan; and
sensing the duty cycle of the pulse-width modulation during operation of the one or more fans.

7. The method of claim 1, wherein the computer system is a first computer system, the one or more fans are installed on a second computer system that is connected to the first computer system via a network connection, and the method further comprises:
receiving, via the network connection, a rotational speed of each of the one or more fans sensed by the second computer system during operation of a respective fan; and
receiving, via the network connection, the duty cycle of the pulse-width modulation sensed by the second computer system during operation of the one or more fans.

8. The method of claim 1, wherein each of the at least two first effective ranges represents a different predicted state of the one or more fans, and wherein each of the at least two first effective ranges represents a different number of standard variation from a nominal value.

9. An apparatus comprising:
a processor configured to:
generate a model representative of at least a relationship between a rotational speed of one or more fans configured to cool computing components and an a duty cycle of a pulse-width modulation of electrical current supplied to the one or more fans;
determine at least three first effective ranges for the rotational speed of the one or more fans as a function of the duty cycle based on the model, wherein the processor determines the at least three first effective ranges by:
determining a non-critical range for the rotational speed of the one or more fans as the function of the duty cycle based on the model, the non-critical range spanning from a lower non-critical value to an upper non-critical value,
determining a critical range for the rotational speed of the one or more fans as the function of the duty cycle based on the model, the critical range spanning from a lower critical value to an upper critical value, and
determining a non-recoverable range for the rotational speed of the one or more fans as the function of the duty cycle based on the model, the non-recoverable range spanning from a lower non-recoverable value to an upper non-recoverable value;

monitor data representative of the rotational speed of the one or more fans and data representative of the duty cycle; and
generate a predictive failure alert based on a relationship between the data representative of the rotational speed indicates that the rotational speed and one or more of the at least three first effective ranges for a particular value of the duty cycle.

10. The apparatus of claim 9, wherein the model is generated based on calibrated parameters of the one or more fans and the model is further representative of a relationship between electrical current drawn by the one or more fans and the duty cycle of the pulse-width modulation and the processor is further configured to:
determine a second effective range for the electrical current drawn by the one or more fans as a function of the duty cycle of the pulse-width modulation based on the model; and
monitor data representative of the electrical current drawn by the one or more fans, wherein, in generating the predictive failure alert, the processor is configured to generate the predictive failure alert when the data representative of the electrical current drawn by the one or more fans indicates that the electrical current is outside of the second effective range for the particular value of the duty cycle of the pulse-width modulation or the data representative of the rotational speed indicates that the rotational speed is outside of the one or more of the at least three first effective ranges for the particular value of the duty cycle of the pulse-width modulation.

11. The apparatus of claim 9, wherein the relationship is a linear relationship with steps that cover duty cycles above approximately 90% and below approximately 10%.

12. The apparatus of claim 9, wherein the one or more fans are installed on the apparatus and the apparatus further comprises:
a rotational speed sensor configured to:
sense a rotational speed of each of the one or more fans during operation of the one or more fans; and
generate the data representative of the rotational speed of each of the one or more fans; and
an electrical sensor configured to:
sense the duty cycle of the pulse-width modulation during operation of the one or more fans; and
generate the data representative of the duty cycle.

13. The apparatus of claim 9, wherein the apparatus is a server system, the one or more fans are installed on a computing device, and the apparatus further comprises:
a communications interface configured to:
connect the server system to the computing device via a network connection;
receive, via the network connection, a rotational speed of each of the one or more fans sensed by the computing device during operation of a respective fan; and
receive, via the network connection, the duty cycle of the pulse-width modulation sensed by the computing device during operation of the one or more fans.

14. The apparatus of claim 9, wherein each of the at least three first effective ranges represents a different predicted state of the one or more fans, and wherein each of the at least three first effective ranges represents a different number of standard variation from a nominal value.

15. One or more non-transitory computer readable storage media encoded with software comprising computer executable instructions and when the software is executed operable to:
  generate a model representative of at least a relationship between a rotational speed of one or more fans configured to cool computing components and a duty cycle of a pulse-width modulation of electrical current supplied to the fan;
  determine at least three first effective ranges for the rotational speed of the one or more fans as a function of the duty cycle based on the model, wherein the processor determines the at least three first effective ranges by:
    determining a non-critical range for the rotational speed of the one or more fans as the function of the duty cycle based on the model, the non-critical range spanning from a lower non-critical value to an upper non-critical value,
    determining a critical range for the rotational speed of the one or more fans as the function of the duty cycle based on the model, the critical range spanning from a lower critical value to an upper critical value, and
    determining a non-recoverable range for the rotational speed of the one or more fans as the function of the duty cycle based on the model, the non-recoverable range spanning from a lower non-recoverable value to an upper non-recoverable value;
  monitor data representative of the rotational speed of the one or more fans and data representative of the duty cycle; and
  generate a predictive failure alert based on a relationship between the data representative of the rotational speed indicates that the rotational speed and one or more of the at least three first effective ranges for a particular value of the duty cycle.

16. The one or more non-transitory computer readable storage media of claim 15, wherein the model is generated based on calibrated operating parameters of the one or more fans and the model is further representative of a relationship between electrical current drawn by the one or more fans and the duty cycle of the pulse-width modulation, and the computer executable instructions are further operable to:
  determine a second effective range for the electrical current drawn by the one or more fans as a function of the duty cycle of the pulse-width modulation based on the model; and
  monitor data representative of the electrical current drawn by the one or more fans, wherein, in generating the predictive failure alert, the computer executable instructions are further operable to generate the predictive failure alert when the data representative of the electrical current drawn by the one or more fans indicates that the electrical current is outside of the second effective range for the particular value of the duty cycle of the pulse-width modulation or the data representative of the rotational speed indicates that the rotational speed is outside of the one or more of the at least three first effective ranges for the particular value of the duty cycle of the pulse-width modulation.

17. The one or more non-transitory computer readable storage media of claim 15, wherein the relationship is a linear relationship with steps that cover duty cycles above approximately 90% and below approximately 10%.

18. The one or more non-transitory computer readable storage media of claim 15, wherein the software is executed on a computing device including the one or more fans and the computer executable instructions are further operable to:
  sense a rotational speed of each of the one or more fans during operation of a respective fan; and
  sense the duty cycle of the pulse-width modulation during operation of the one or more fans.

19. The one or more non-transitory computer readable storage media of claim 15, wherein the software is executed on a first computing device, the one or more fans are installed on a second computing device that is connected to the first computing device via a network connection, and the computer executable instructions are further operable to:
  receive, via the network connection, a rotational speed of each of the one or more fans sensed by the second computing device during operation of a respective fan; and
  receive, via the network connection, the duty cycle of the pulse-width modulation sensed by the second computing device during operation of the one or more fans.

20. The one or more non-transitory computer readable storage media of claim 15, wherein each of the at least three first effective ranges represents a different predicted state of the one or more fans, and wherein each of the at least three first effective ranges represents a different number of standard variation from a nominal value.

* * * * *

UNITED STATES PATENT AND TRADEMARK OFFICE
CERTIFICATE OF CORRECTION

PATENT NO. : 10,620,674 B2
APPLICATION NO. : 15/628694
DATED : April 14, 2020
INVENTOR(S) : Rakesh Bhatia et al.

It is certified that error appears in the above-identified patent and that said Letters Patent is hereby corrected as shown below:

In the Claims

Claim 4, Column 15, Line 8, please replace "wherein the monitoring" with --wherein monitoring--

Signed and Sealed this
Seventh Day of July, 2020

Andrei Iancu
*Director of the United States Patent and Trademark Office*